US008774066B2

(12) United States Patent
Ghauri et al.

(10) Patent No.: US 8,774,066 B2
(45) Date of Patent: Jul. 8, 2014

(54) MACRO-FEMTO INTER-CELL INTERFERENCE MITIGATION

(75) Inventors: Irfan Ghauri, Cagnes sur Mer (FR); Francesco Negro, Juan les Pins (FR); Dirk Slock, Vallauris (FR)

(73) Assignee: Intel Mobile Communications GmbH, Neubiberg (DE)

( * ) Notice: Subject to any disclaimer, the term of this patent is extended or adjusted under 35 U.S.C. 154(b) by 61 days.

(21) Appl. No.: 13/484,453

(22) Filed: May 31, 2012

(65) Prior Publication Data

US 2013/0322301 A1     Dec. 5, 2013

(51) Int. Cl.
*H04W 16/14* (2009.01)
*H04W 24/02* (2009.01)
*H04W 16/02* (2009.01)

(52) U.S. Cl.
CPC .............. *H04W 16/14* (2013.01); *H04W 24/02* (2013.01); *H04W 16/02* (2013.01)
USPC ............................ 370/280; 375/260; 375/285

(58) Field of Classification Search
CPC ..... H04W 16/02; H04W 16/14; H04W 16/28; H04W 24/02
USPC .......................... 370/228, 280; 375/260, 285
See application file for complete search history.

(56) References Cited

U.S. PATENT DOCUMENTS

| 2009/0122887 | A1* | 5/2009 | Li et al. | 375/260 |
| 2012/0046038 | A1* | 2/2012 | Gao et al. | 455/447 |
| 2013/0142273 | A1* | 6/2013 | Sollenberger et al. | 375/285 |

FOREIGN PATENT DOCUMENTS

EP     1701466 A1     9/2006

OTHER PUBLICATIONS

Cadambe and Jafar, "Interference Alignment and Degrees of Freedom of the K-User Interference Channel", IEEE Transactions on Informaton Theory, vol. 54, No. 8, Aug. 2008, pp. 3425-3441.
Guillaud et al., "A Practical Metod for Wireless Channel Reciprocity Exploitation Through Relative Calibration", ISSPA 2005, 8th International Symposium on Signal Processing and its Applications, Aug. 29-Sep. 1, 2005, Sydney, Australia, pp. 1-4.
Gomadan et al., "Approaching the Capacity of Wireless Networks through Distributed Interference Alignment", IEEE Global Telecommunications Conference (Globecom), Nov. 30-Dec. 4, 2008, New Orleans, Louisiana, USA, pp. 1-10.
Negro et al., "Spatial Interweave for a MIMO Secondary Interference Channel with Multiple Primary Users", Fourth International Workshop on Cognitive Radio and Advanced Spectrum Management (CogART), Oct. 26-29, 2011, Barcelona, Spain, pp. 1-5.
Bourdoux et al., "Non-reciprocal Transceivers in OFDM/SDMA Systems: Impact and Mitigation", 2003 IEEE Radio and Wireless Conference (RAWCON), Aug. 10-13, 2003, Boston, Massachusetts, USA, pp. 183-186.

\* cited by examiner

*Primary Examiner* — Michael Thier
*Assistant Examiner* — Brian Cox

(57) ABSTRACT

A method, system, and apparatus is provided for interference calibration. A second mobile terminal may be configured to send timing information to a network interface in an uplink channel of a second communication system. The network interface may be configured to communicate with a first mobile terminal in a downlink channel in a first communication system; estimate the uplink channel using the timing information to form a channel estimation; and adjust the downlink channel to the first mobile terminal using the channel estimation.

15 Claims, 5 Drawing Sheets

MACRO-FEMTO INTER-CELL INTERFERENCE MITIGATION

FIELD

Aspects relate generally to systems and methods for managing interference with user equipment.

BACKGROUND

Beamforming and Interference alignment (IA) are techniques for interference suppression. Beamforming is a signal processing technique used in sensor arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity. The improvement compared with omnidirectional reception/transmission is known as the receive/transmit gain (or loss).

Interference alignment (IA) for wireless networks is a technique for increasing the multiplexing gain on the interference channel. It consists in forcing interfering signals at each receiver into a reduced-dimensional subspace of the received space, so that the receivers can observe an interference-free desired signal. The considered space may be an actual space (time, frequency, physical path) or structural space of the signal.

Beamforming at transmitter needs to know downlink channel. This is normally done by a communication between the transmitter and receiver.

Additionally, Uplink-Downlink channels still require frequent calibration due to drift in front-end electronics. This required low-rate feedback of the CSI between TX/RX pairs. While it is possible to calibrate corresponding TX/RX pairs, it is not possible to calibrate crosslinks between interfering pairs that are not communicating pairs in an interference channel.

BRIEF SUMMARY

In accordance with an illustrative aspect, a method for interference calibration at a network interface is provided. The method comprises communicating with a first mobile terminal in a downlink channel in a first communication system; receiving timing information from a second mobile terminal in an uplink channel of a second communication system; estimating the uplink channel using the timing information to form a channel estimation; and adjusting the downlink channel to the first mobile terminal using the channel estimation.

In accordance with an illustrative aspect, a system for interference calibration is provided. The system comprising a second mobile terminal configured to send timing information to a network interface in an uplink channel of a second communication system; and the network interface configured to communicate with a first mobile terminal in a downlink channel in a first communication system; estimate the uplink channel using the timing information to form a channel estimation; and adjust the downlink channel to the first mobile terminal using the channel estimation.

In accordance with an illustrative aspect, and apparatus is provided. The apparatus comprises a transceiver configured to communicate with a first mobile terminal in a downlink channel in a first communication system; and receive timing information from a second mobile terminal in an uplink channel of a second communication system; and an estimator module configured to estimate the uplink channel using the timing information to form a channel estimation; and adjust the downlink channel to the first mobile terminal using the channel estimation.

BRIEF DESCRIPTION

Aspects will be explained in more detail in the following text, and are illustrated in the figures, in which.

DETAILED DESCRIPTION

Figure 1:
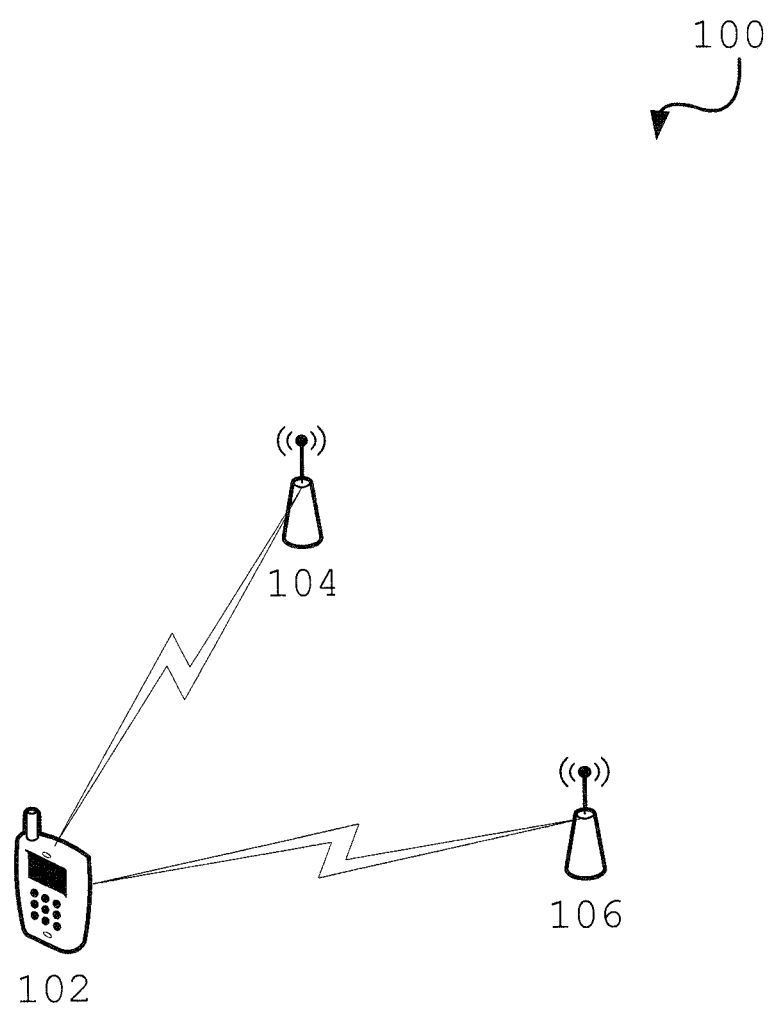
FIG. 1 shows a communication system in accordance with an aspect of this disclosure.

The following detailed description refers to the accompanying drawings that show, by way of illustration, specific details and aspects in which the invention may be practiced. The word "exemplary" is used herein to mean "serving as an example, instance, or illustration". Any aspect or design described herein as "exemplary" is not necessarily to be construed as preferred or advantageous over other aspects or designs.

Note that in this Specification, references to various features (e.g., elements, structures, modules, components, steps, operations, characteristics, etc.) included in "one aspect", "example aspect", "an aspect", "another aspect", "some aspects", "various aspects", "other aspects", "alternative aspect", and the like are intended to mean that any such features are included in one or more aspects of the present disclosure, but may or may not necessarily be combined in the same aspects.

Note that in this Specification, references to "a number of" may mean one or more. For example, a number of objects may be one object, ten objects, fifty objects, or any number of objects. Also note that in this Specification, references to "at least one of" may mean any combination. For example, at least one of object A and object B may be object A, object B, or both objects A and B.

Although the description is illustrated and described herein with reference to certain aspects, the description is not intended to be limited to the details shown. Modifications may be made in the details within the scope and range equivalents of the claims.

One or more aspects recognizes that the problem of channel calibration has not been studied until now for IA. The usual assumption in the algorithms to design IA beamformers is channel reciprocity. In real TDD systems, the Uplink (UL) and Downlink (DL) channel can be assumed to be reciprocal only after channel calibration that compensates for UL and DL channel mismatch due to different electronic components in the receiver (Rx) and transmit (Tx) frontends.

One or more aspects provide a solution to the problem of channel calibration for designing Interference Alignment (IA) beamformers in a K-user MIMO Interference channel in Time Division Multiplexing (TDD) transmission scheme. These aspects can also be applied to a MIMO Spatial Interweave Cognitive Radio setting. In particular, the aspects show that channel calibration is not a problem that prevents IA beamforming in TDD transmission schemes.

One or more aspects provide that Beamforming and Interference alignment (IA) require channel state information at the transmitters (CSIT). In Time-Division Duplex (TDD) the uplink (UL) and downlink (DL) channels are reciprocal; thus estimated channel from UL can be used for DL beamforming/IA.

One or more aspects provide a solution to the problem of calibration issues by first, doing relative calibration between Tx and Rx of each pair of users. Then, each Mobile User (MU) sends pilots in the UL transmission slot. This way all Base Stations (BS) can estimate the needed UL channel to compute the UL IA filters. Next, to apply the UL filters in the DL communication phase a simple modification of the precomputed matrices is require to compensate for the channel mismatch between UL and DL.

One or more aspects provide that channel calibration among terminals that do not belong to the same pair of Tx and Rx is not required to find the set of IA beamformers for the DL transmission phase. Each user only needs to know its own calibration filters to apply the UL IA filter in the DL communication. This concept is the only solution that can allow IA beamformers design in the spatial interweave cognitive radio channel because it does not require cooperation between primary and secondary.

One or more aspects provide relative channel calibration (neither Tx nor Rx is the reference, both calibrate relative to each other). This procedure requires a training phase between pairs of users. A possibility to study whether the aspects of this disclosure are applied or not is to detect the information exchange between users. They need to exchange UL and DL channel estimate in order to being able to calculate the channel calibration matrices to compensate for UL-DL channel mismatching. Another key aspect of our technique is the lack of cooperation between primary and secondary users. In TDD communication scheme if the objective of secondary beamformer design is IA and it does not require channel exchange between primary and secondary for channel calibration then our solution must be applied.

FIG. 1 shows a communication system in accordance with an illustrative aspect.

In an aspect, communication system 100 may include suitable interfaces for receiving, transmitting, and/or otherwise communicating data or information in a network environment. Such network interfaces may be inclusive of multiple wireless technologies, for example, WiFi, WiMax, 3G, 4G, white space, 802.11x, satellite, Bluetooth, near field communication, LTE, GSM/WCDMA/HSPA, CDMA1x/EVDO, DSRC, CAN, GPS, etc. Communication system 100 may operate under Time Division Duplexing (TDD), Frequency Division Duplexing (FDD), or any other types of communication modes.

Communication system 100 may include mobile terminal 102 and base stations 104 and 106. In other aspects, communication system 100 may include more or less base stations and user equipment devices. In an aspect, base stations 104 and 106 may be network interfaces. The base stations may be nodeBs or eNBs (evolved Node Bs). In terms of 3GPP LTE base stations 104, 106 may be pico-/femtocells which can be operator-deployed or user-deployed. Even though only certain communications technologies are discussed herein, such as LTE, the scope of the claims cover other technology groups as well, such as LTE-A, UMTS, GPRS, GSM, or any other suitable wireless technology.

Mobile terminal 102 may be referred to as a communication terminal, mobile device, mobile user, user, or user equipment. Mobile terminal 102 may include network interfaces for receiving, transmitting, and/or otherwise communicating data or information. Mobile terminal 102 can be a hand-held mobile phone, a laptop computer equipped with a mobile broadband adapter, or any other device capable of communicating with base stations 104 and 106.

Even though it appears in FIG. 1 that user equipment 102 is connected with both of base stations 104 and 106, it is understood that user equipment 102 may be connected with any number of the network interfaces at any time.

Figure 2:
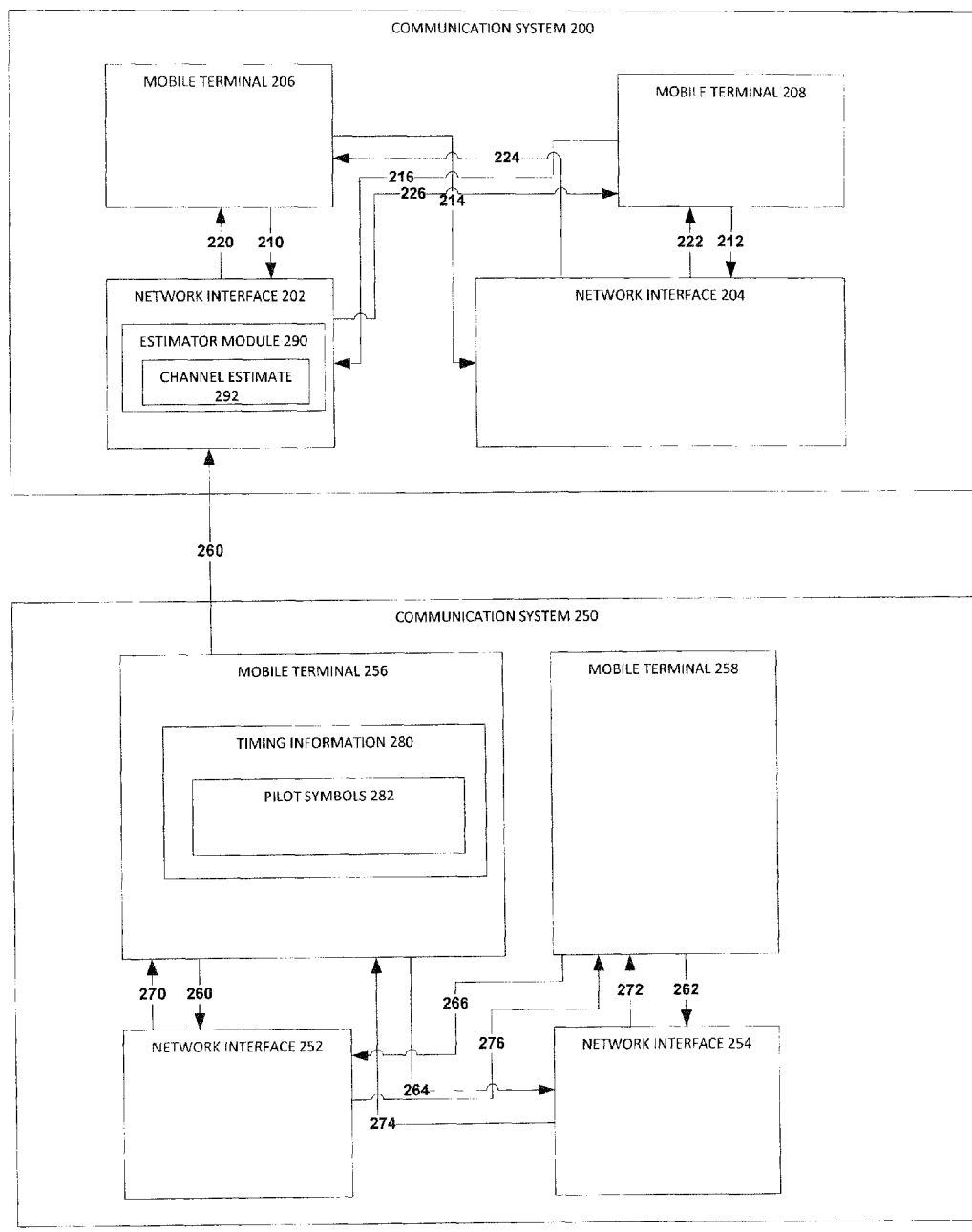
FIG. 2 shows a set of time-frequency resource grids in accordance with an aspect of this disclosure.

FIG. 2 shows communication systems in accordance with an illustrative aspect. Communication system 200 may be one example of communication system 100 as shown in FIG. 1. Additionally, communication 250 may be another example of communication system 100 as shown in FIG. 1.

In an aspect, communication system 200 may include network interfaces 202, 204 and mobile terminals 206, 208. Communication system 250 may include network interfaces 252, 524 and mobile terminals 256, 258. Communication systems 200 and 250 may include more or less base stations and mobile terminals.

In an aspect of this disclosure, communication systems 200 and 250 may be a member of the same service operator or different service operators. Communication systems 200 and 250 may operate using the same communication mode, such as Time Division Duplexing (TDD), or different communication technologies.

In different aspects, mobile terminals 206, 208, 256, 258 may be any type of network interface capable of transmitting or receiving a wireless signal or radio signal. For example, user equipment 206 may be a laptop, mobile phone, user equipment, smart phone, automobile, machine-to-machine (M2M) device, stationary devices, or other suitable device. Mobile terminals 206, 208, 256, 258 may include antennas, processing units, and memory element.

The antennas may be configured to send and receive a plurality of signals on different radio frequency technologies. For example, the antennas may operate with WiFi, WiMax, 3G, 4G, white space, 802.11x, satellite, Bluetooth, near field communication, LTE, GSM/WCDMA/HSPA, CDMA1x/EVDO, DSRC, CAN, GPS, etc. In other aspects, mobile terminals 206, 208, 256, 258 may have more or less antennas and the antennas may be configured to communicate with other wireless technologies. The antennas may be connected to a transceiver which operates the antennas.

Network interfaces 202, 204, 252, 254 may be base stations, such as base stations 104, 106 as shown in FIG. 1. Such network interfaces may be inclusive of multiple wireless technologies, for example, WiFi, WiMax, 3G, 4G, white space, 802.11x, satellite, Bluetooth, near field communication, LTE, GSM/WCDMA/HSPA, CDMA1x/EVDO, DSRC, CAN, GPS, etc. Communication system 100 may operate under Time Division Duplexing (TDD), Frequency Division Duplexing (FDD), or any other types of communication modes.

Between each network interface 202, 204 and mobile terminals 206, 208 there are communication channels. For example, there are uplink channels 210, 212, 214, and 216. Additionally, there are downlink channels 220, 222, 224, 226.

Between each network interface 252, 254 and mobile terminals 256, 258 there are communication channels. For example, there are uplink channels 260, 262, 264, 266. Additionally, there are downlink channels 270, 272, 274, 276.

Uplink channels are the transmission paths from the mobile terminals to the network interfaces. Downlink channels are the transmission paths from the network interfaces to the mobile terminals.

In an aspect of this disclosure, downlink channels 220, 222 may interfere with mobile terminals 256, 258 reception of downlink channels 270, 272.

Additionally, network interfaces 202, 204 may receive uplink transmissions from mobile terminals 256, 258 even though they are in different communication systems. The uplink transmission may include timing information 280. Timing information 280 may include pilot symbols 282 and be transmitted through a common control physical channel. Even though only mobile terminal 256 is shown having timing information and pilot symbols, it is understood that all mobile terminals may have timing information and pilot symbols.

In an aspect, base station 202 has estimator module 230. Estimator module 290 may use timing information 280 to estimate the uplink channel from, for example, mobile terminal 256 to form channel estimate 292. Even though only network interface 202 is shown having an estimator module and channel estimates, it is understood that all network interfaces may have estimator modules and channel estimates.

Channel estimation may refer to an estimation of the frequency response of the path between the network interface and mobile terminal. Channel estimation 292 can be used to optimize performance and maximize the transmission rate. Knowledge of a channel may be necessary with a wireless channel that is changing rapidly with time. Channel estimate In an aspect, network interface 202 may include one or more memory elements for storing information to be used in achieving operations associated with applications management, as outlined herein. For example, a policy may be stored in memory elements for optimizing signal interference management in communication systems.

These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information in communication systems could be provided in any database, register, table, cache, queue, control list, or storage structure, based on particular needs and implementations, all of which could be referenced in any suitable timeframe. Any of the memory or storage items discussed herein should be construed as being encompassed within the broad term 'memory element' as used herein in this disclosure.

In example aspects, the operations for managing signal interference outlined herein may be implemented by logic encoded in one or more tangible media, which may be inclusive of non-transitory media (e.g., embedded logic provided in an application-specific integrated circuit (ASIC), digital signal processor (DSP) instructions, software potentially inclusive of object code and source code to be executed by a processor or other similar machine, etc.). In some of these instances, one or more memory elements can store data used for the operations described herein. This includes the memory elements being able to store software, logic, code, or processor instructions that are executed to carry out the activities described in this disclosure.

Additionally, a processing unit may execute any type of instructions associated with the data to achieve the operations detailed herein in this disclosure. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

A processing unit may be a number of processors, a multi-processor core, a shared processor, or some other type of processor, depending on the particular implementation. A number, as used herein with reference to an item, means one or more items. Further, a processing unit may be implemented using a number of heterogeneous processor systems in which a main processor is present with secondary processors on a single chip. As another illustrative example, a processing unit may be a symmetric multi-processor system containing multiple processors of the same type.

The illustration of communication systems 200 and 250 in FIG. 2 is not meant to imply physical or architectural limitations to the manner in which an aspect of this disclosure may be implemented. Other components in addition and/or in place of the ones illustrated may be used. Some components may be unnecessary in an aspect of this disclosure.

Figure 3:
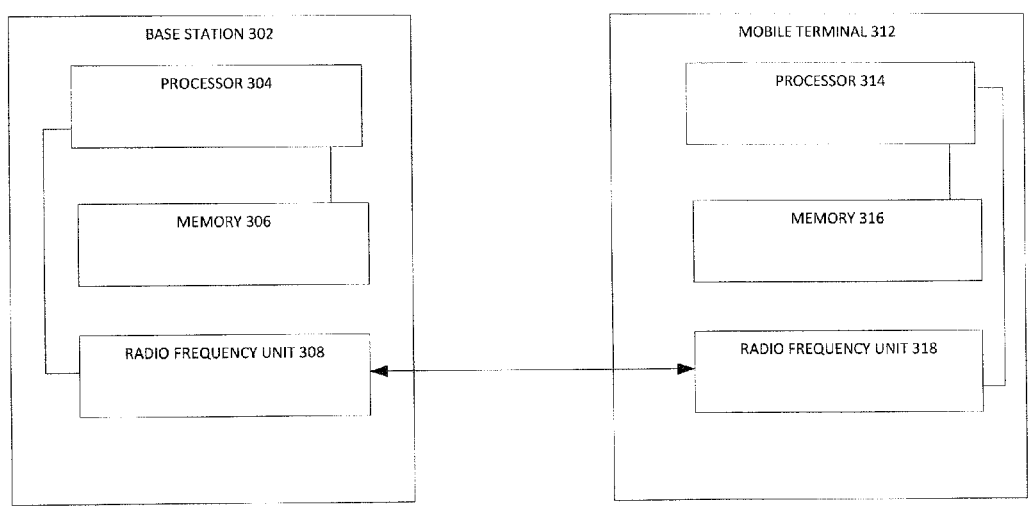
FIG. 3 shows a communication system in accordance with an aspect of this disclosure.

FIG. 3 is a block diagram showing a wireless communication system in accordance with an aspect of this disclosure.

A base station 302 includes a processor 304, a memory 306, and a radio frequency (RF) unit 308. The memory 306 is coupled to the processor 304, and stores a variety of information for driving the processor 304. The RF unit 308 is coupled to the processor 304, and transmits and/or receives a radio signal.

The processor 304 implements the proposed functions, processes and/or methods. The processor 304 may perform MDT measurement (for instance, MDT UL Measurements) according to the embodiments herein.

A mobile terminal 312 includes a processor 314, a memory 316, and an RF unit 318. The memory 316 is coupled to the processor 314, and stores a variety of information for driving the processor 314. The RF unit 318 is coupled to the processor 314, and transmits and/or receives a radio signal.

The processor 314 implements the proposed functions, processes and/or methods. The processor 314 may perform MDT measurement (for instance, 'legacy' MDT measurements) according to the embodiments herein.

Memory 306 and/or 316 may be used for storing information to be used in achieving operations associated with network measurements, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information in any communication system could be provided in any database, register, table, cache, queue, control list, or storage structure, based on particular needs and implementations, all of which could be referenced in any suitable timeframe. Any of the memory or storage items discussed herein should be construed as being encompassed within the broad term "memory" or "memory element" as used herein in this disclosure.

In example embodiments, the operations for managing signal interference outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements can store data used for the operations described herein. This includes the memory elements being able to store software, logic, code, or processor instructions that are executed to carry out the activities described in this disclosure.

Additionally, the processors, or processing units, herein may execute any type of instructions associated with the data to achieve the operations detailed herein in this disclosure. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Processors 304, 314 may be a number of processors, a multi-processor core, a shared processor, or some other type of processor, depending on the particular implementation. A number, as used herein with reference to an item, means one or more items. Further, processors 304, 314 may be implemented using a number of heterogeneous processor systems in which a main processor is present with secondary processors on a single chip. As another illustrative example, processors 304, 314 may be a symmetric multi-processor system containing multiple processors of the same type.

RF units 308, 318 may include transceivers used to transmit and/or receive a radio signal.

In one or more aspects of this disclosure, measuring unit 320 and determining unit 322 may be located on processor 304 or part of the logic executed by processor 304.

Figure 4:
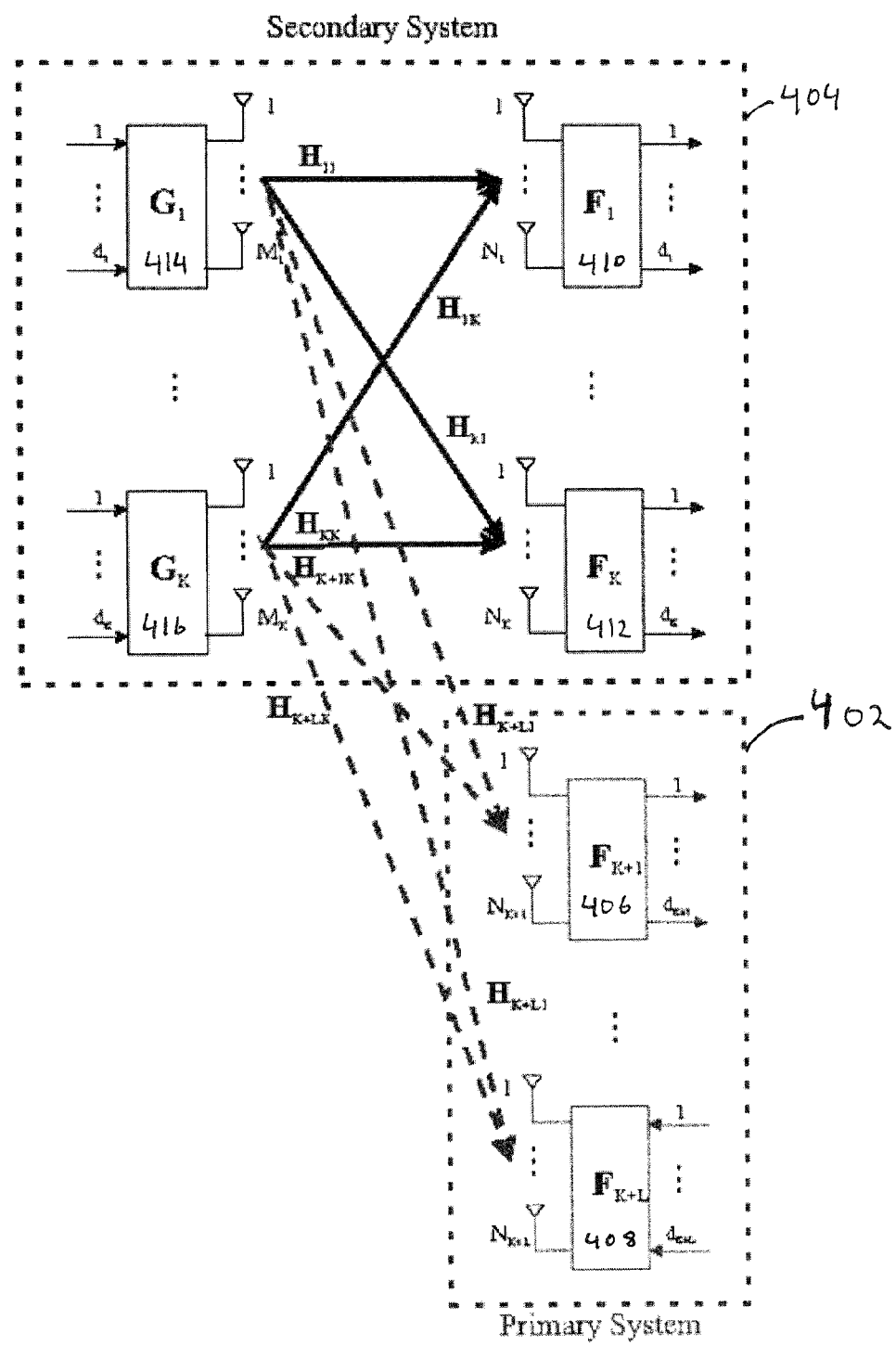
FIG. 4 is an illustration of overlapping communications systems in accordance with an aspect of this disclosure.

FIG. 4 is an illustration of overlapping communications systems in accordance with an aspect of this disclosure.

In FIG. 4, the two systems are primary system 402 and secondary system 404. Primary system 402 may be one example of one aspect of communication system 250 as shown in FIG. 2. Secondary system 204 may be one example of one aspect of communication system 200 as shown in FIG. 2.

Primary system 402 has receivers 406, 408 denoted by F. Receivers 406, 408 may be mobile terminals, such as mobile terminals 256, 258 as shown in FIG. 2. Secondary system 404 has receivers 410, 412 denoted by F. receivers 410, 412 may be mobile terminals, such as mobile terminals 206, 208 as shown in FIG. 2. Also, secondary system has transmitters 414, 416 denoted by G. Receivers 406, 408 may be mobile terminals, such as mobile terminals 256, 258 as shown in FIG. 2.

In primary system 402 and secondary system 404, downlink channels 418 are denoted by H. Even there are only two transmitters and four receivers shown, the aspects of this disclosure may be applied to any number of transmitter/receiver combinations.

To compute the transmitter (Tx) and receiver (Rx) IA filters in a TDD transmission scheme calibration between Tx and Rx belonging to different pair of users, e.g. BSi and MUk, for i≠k, it suffices to calibrate between BSi and MUi. Thus there may be no need to calibrate between BSi and MUk. Once each terminal knows its own calibration matrix and the UL IA filter, it can easily compute the DL filters.

The system setting in FIG. 4 can be used to model the coexistence of a set K of femto-cells with the presence of L macro-users.

The secondary network may be a K-link MIMO interference channel with K transmitter-receiver pairs. To differentiate the two transmitting and receiving devices, it may be assume that each of the K pairs is composed of a secondary Base station (SBS) and a secondary Mobile user (SMU). This may be only for notational purposes. The k-th SBS and its corresponding SMU are equipped with $M_k$ and $N_k$ antennas respectively. The k-th transmitter generates interference at all non-intended receivers (for this reason it is called interference channel).

$H_{kl} \in C^{N_k \times M_l}$ represents the DL channel matrix between the l-th transmitter and k-th receiver. We denote by $G_k \in C^{M_k \times d_k}$ the precoding matrix of the k-th transmitter. The k-th receiver applies $F_k \in C^{d_k \times N_k}$ to suppress interference and retrieve its $d_k$ desired streams.

The secondary network wants to coexist with a set of L multi antenna primary mobile users (PMU). To simplify the notation, the L PMUs are indexed from K+1 to K+L. With this notation the channel matrix between the $SBS_k$ and $PMU_{K+l}$ is denoted $H_{K+lk}$ and has dimensions $N_{K+l} \times M_k$, where $N_{K+l}$ represents the number of antennas at PMU. The receiver filter applied at the $PMU_{K+l}$ is denoted as $F_{K+l}$. The optimization of the primary transmission is not considered so it is a general receiver. It may be assumed that it involves a fixed number of transmitted streams $d_{K+l}$. In the following, the primary transmitter (PBS) is located far from the secondary system and hence no interference is caused to the secondary network from the primary communication.

The objective in IA, for a traditional K-user MIMO IFC, is to design spatial filters to be applied at the transmitters such that, the interference caused by all transmitters at each non-intended RX lies in a common interference subspace. Moreover, the interference subspace and the desired signal subspace of each RX should be non-overlapping (linearly independent). If alignment is complete, simple zero forcing (ZF) can be applied to suppress the interference and extract the desired signal in the high-SNR regime. For a cognitive radio (CR) setting that includes also L primary receiver it may be desirable to design a set of K IA beamformers and receiver filters such that the interference at each primary MU is constrained in the subspace of fixed dimensions. In this system model, the interference alignment condition for the Downlink communication will be modified to include the CR constraint:

$$F_k H_{kl} G_l = 0 \qquad \forall l \neq k \qquad (1)$$

$$\mathrm{rank}(F_k H_{kk} G_k) = d_k \qquad \forall k$$

$$\mathrm{rank}\left(\sum_{k=1}^{K} H_{K+lk} G_k\right) \leq N_{K+l} - d_{K+l} \qquad \forall l = 1, \ldots, L$$

In a TDD communication scheme the DL channel, from SBS l to the k-th SMU, can be written in function of the measured UL channel:

$$H_{kl} = P_{MU_k} U_{lk}^T P_{BS_l}$$

Where $U_{lk}$ represents the measured uplink channel. Where $P_{MU_k}$ and $P_{BS_l}$ represent the calibration matrices at $SMU_k$ and $SBS_l$ respectively. They only depend on the electronic components of the Rx and Tx frontends at respective sides. Those matrices represent the mismatch between the UL and DL channels. The objective of relative calibration may be to find these matrices using estimates of the UL and DL channel obtained through classical channel feedback operation. Complete calibration requires an UL to DL and another DL to UL training phase between users. Despite the stringent secondary beamformer requirement of apportioning signals so that interference lies in crosslink Rx noise subspace, no calibration may be required between crosslink Tx-Rx devices.

Once all K pairs of users have done relative channel calibration, all SBS and SMU know their own calibration matrix. This calibration phase may be done only among pairs with no cross calibration required. The following step is UL channel estimation. In this phase SMUs send pilots in the UL channel during the UL transmission slot. Using these pilot symbols each $SBS_k$ can estimate the UL channel between itself and the other $SMU_l$. Using UL channel knowledge SBSs can calculate the UL IA transmit and receiving filters using one of the iterative algorithms available, such that:

$$\overline{F}_k U_{kl} \overline{G}_l = 0$$

$\overline{F}_k$ is the UL receive filter matrix of dimensions $d_k \times M_k$ applied at BS number k.

$\overline{G}_l$ is the UL transmit filter matrix of dimensions $N_l \times d_l$ applied at MU number l.

After the calculation of the UL filters we can determine the Tx and Rx filters applied in the DL communication using the following identities:

$$G_k = P^{-1}_{BS_k} \overline{F}_k^T$$

$$F_l = \overline{G}_l^T P_{MU_l}^{-1} \quad (2)$$

Applying the IA filters found using (2) in the DL channel we get:

$$F_l H_{lk} G_k = F_l P_{MU_l} U_{kl}^T P_{BS_k} G_k = \overline{G}_l^T U_{lk}^T \overline{F}_k^T = (\overline{F}_k U_{kl} \overline{G}_l)^T = 0 \quad (3)$$

From equation (3), it is identified that using the UL IA filter, IA can be performed also in the DL channel. To compute the DL IA matrices there may be no need for cross calibration between users because each terminal only needs to know its own calibration matrix.

Figure 5:
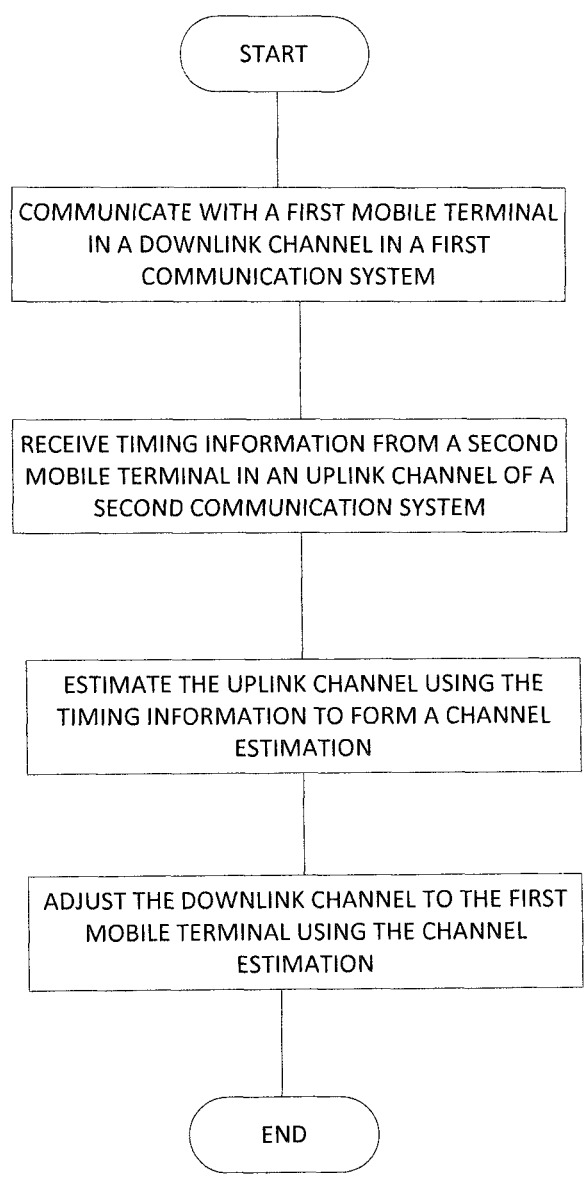
FIG. 5 is a flowchart for interference alignment in accordance with an aspect of this disclosure.

FIG. 5 is a flowchart for interference alignment in accordance with an illustrative aspect. Process 500 may be used in a communication system, such as communication system 200 as shown in FIG. 2 or the combination of communication systems 200, 250.

Process 500 begins with communicating with a first mobile terminal in a downlink channel in a first communication system (step 502). The base station may be communicating with a first mobile terminal in the same communication system. The communication may be in both the uplink and downlink paths.

Then, the process receives timing information from a second mobile terminal in an uplink channel of a second communication system (step 504). The timing information may be pilot symbols. The uplink channel may be a common control physical channel. In different aspects using different radio frequency technologies, the uplink channel used to transmit the pilot symbols may be whatever uplink channel that particular radio frequency technology uses to transmit pilot channels. The second mobile terminal may be in a different communication system than the network interface and first mobile terminal. The second communication system may be a separate service provider, different radio frequency technology, or both. In an aspect of this disclosure, a mobile terminal in the second communication system does not communicate in the downlink with base stations in the first communication system. In an aspect of this disclosure, the first communication system, second communication system, or both may be operating in TDD.

Next, the process estimates the uplink channel using the timing information to form a channel estimation (step 506). Then, the process adjusts the downlink channel to the first mobile terminal using the channel estimation (step 508). Adjusting the downlink channel may be applying IA filters to the downlink communications. Adjusting the downlink channel may be a calibration of the downlink channel so that it does not interfere with the second mobile terminal.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

An aspect of this disclosure has provided a method for interference calibration at a network interface. The method comprising: communicating with a first mobile terminal in a downlink channel in a first communication system; receiving timing information from a second mobile terminal in an uplink channel of a second communication system; estimating the uplink channel using the timing information to form a channel estimation; and adjusting the downlink channel to the first mobile terminal using the channel estimation.

An aspect of this disclosure has provided a system for interference calibration, the system comprising: a second mobile terminal configured to send timing information to a network interface in an uplink channel of a second communication system; and the network interface configured to communicate with a first mobile terminal in a downlink channel in a first communication system; estimate the uplink channel using the timing information to form a channel estimation; and adjust the downlink channel to the first mobile terminal using the channel estimation.

An aspect of this disclosure has provided an apparatus. The apparatus comprising: a transceiver configured to communicate with a first mobile terminal in a downlink channel in a first communication system; and receive timing information from a second mobile terminal in an uplink channel of a second communication system; and an estimator module configured to estimate the uplink channel using the timing information to form a channel estimation; and adjust the downlink channel to the first mobile terminal using the channel estimation.

In any aspect of this disclosure, the timing information is pilot symbols.

In any aspect of this disclosure, the uplink channel is a common control physical channel In any aspect of this disclosure, the second communication system is operating in time duplex division mode.

In any aspect of this disclosure, the first communication system is a separate communication system than the second communication system.

In any aspect of this disclosure, the first mobile terminal and the network interface are part of the same communication system.

The invention claimed is:

1. A method for interference calibration at a network interface of a first communication system, the method comprising:
communicating with a first mobile terminal in a downlink channel in a first communication system;
receiving timing information from a second mobile terminal in an uplink channel of a second communication system;
estimating the uplink channel in the second communication system using the timing information to form a channel estimation;
computing one or more interference alignment (IA) filters based on the channel estimation; and
adjusting the downlink channel to the first mobile terminal in the first communication system by calibrating the downlink channel to not interfere with the second mobile terminal in the second communication system by applying at least one of the one or more computed IA filters to one or more downlink communications with the first mobile terminal,
wherein the second mobile terminal communicates in an uplink and a downlink channel with one or more base stations of the second communication system but does not communicate in a downlink channel with any base stations belonging to the first communication system.

2. The method of claim 1, wherein the timing information is pilot symbols.

3. The method of claim 1, wherein the uplink channel is a common control physical channel.

4. The method of claim 1, wherein the second communication system is operating in time duplex division mode.

5. The method of claim 1, wherein the first mobile terminal and the network interface are part of the same communication system.

6. A system for interference calibration, the system comprising:
a second mobile terminal configured to send timing information to a network interface in an uplink channel of a second communication system; and
the network interface configured to
communicate with a first mobile terminal in a downlink channel in a first communication system;
estimate the uplink channel using the timing information to form a channel estimation;
compute one or more interference alignment (IA) filters based on the channel estimation; and
adjust the downlink channel to the first mobile terminal in the first communication system by calibrating the downlink channel to not interfere with the second mobile terminal in the second communication system by applying at least one of the one or more computed IA filters to one or more downlink communications with the first mobile terminal,
wherein the second mobile terminal communicates in an uplink and a downlink channel with one or more base stations of the second communication system but does not communicate in a downlink channel with any base stations belonging to the first communication system.

7. The system of claim 6, wherein the timing information is pilot symbols.

8. The system of claim 6, wherein the uplink channel is a common control physical channel.

9. The system of claim 6, wherein the second communication system is operating in time duplex division mode.

10. The system of claim 6, wherein the first mobile terminal and the network interface are part of the same communication system.

11. An apparatus, comprising:
a transceiver configured to
communicate with a first mobile terminal in a downlink channel in a first communication system and
receive timing information from a second mobile terminal in an uplink channel of a second communication system; and
an estimator module configured to
estimate the uplink channel using the timing information to form a channel estimation;
compute one or more interference alignment (IA) filters based on the channel estimation; and
adjust the downlink channel to the first mobile terminal in the first communication system by calibrating the downlink channel to not interfere with the second mobile terminal in the second communication system by applying at least one of the one or more computed IA filters to one or more downlink communications with the first mobile terminal,
wherein the second mobile terminal communicates in an uplink and a downlink channel with one or more base stations of the second communication system but does not communicate in a downlink channel with any base stations belonging to the first communication system.

12. The apparatus of claim 11, wherein the timing information is pilot symbols.

13. The apparatus of claim 11, wherein the uplink channel is a common control physical channel.

14. The apparatus of claim 11, wherein the second communication system is operating in time duplex division mode.

15. The apparatus of claim 11, wherein the first mobile terminal and the network interface are part of the same communication system.

* * * * *